(12) United States Patent
O'Neal

(10) Patent No.: US 8,065,061 B2
(45) Date of Patent: Nov. 22, 2011

(54) PAYLOAD CONTROL SYSTEM BASED ON FORCE AND SPEED

(75) Inventor: Steven Wayne O'Neal, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 1026 days.

(21) Appl. No.: 11/998,413

(22) Filed: Nov. 30, 2007

(65) Prior Publication Data
US 2009/0139790 A1    Jun. 4, 2009

(51) Int. Cl.
*B60W 40/00* (2006.01)
(52) U.S. Cl. .......................................... 701/50; 180/290
(58) Field of Classification Search .............. 701/29–50; 180/290
See application file for complete search history.

(56) References Cited

U.S. PATENT DOCUMENTS

| | | |
|---|---|---|
| 4,529,961 A | 7/1985 | Nishimura et al. |
| 5,070,959 A | 12/1991 | Grabowski |
| 5,182,712 A | 1/1993 | Kyrtsos et al. |
| 5,327,347 A | 7/1994 | Hagenbuch |
| 5,446,452 A | 8/1995 | Litton |
| 5,583,765 A | 12/1996 | Kleehammer |
| 5,631,832 A | 5/1997 | Hagenbuch |
| 5,736,939 A | 4/1998 | Corcoran |
| 5,787,374 A | 7/1998 | Ferguson et al. |
| 6,044,313 A | 3/2000 | Gannon |
| 6,546,363 B1 * | 4/2003 | Hagenbuch ........................ 703/7 |
| 6,721,680 B2 | 4/2004 | Sorrells et al. |
| 6,842,680 B2 | 1/2005 | Doddek et al. |
| 6,868,358 B2 | 3/2005 | Brown, Jr. |
| 7,075,421 B1 | 7/2006 | Tuttle |
| 7,765,039 B1 * | 7/2010 | Hagenbuch ...................... 701/29 |
| 2003/0220729 A1 | 11/2003 | Doddek et al. |
| 2004/0178005 A1 | 9/2004 | Carlstrom et al. |

(Continued)

FOREIGN PATENT DOCUMENTS

EP    1190885 A    3/2002

(Continued)

OTHER PUBLICATIONS http://www.erosioncontrol.com/qx_0011_modern.html, Modern Tire Management, Grading and Excavation Contractor, 2001, pp. 1-12.

(Continued)

*Primary Examiner* — Richard M. Camby
(74) *Attorney, Agent, or Firm* — Finnegan, Henderson, Farabow, Garrett & Dunner LLP

(57) ABSTRACT

In one aspect, the present disclosure is directed to a payload control system for a machine having traction devices. The payload control system may have a force sensor configured to measure a force transmitted through the traction devices. The payload control system may also have a speed sensor configured to measure a speed of the machine. The payload control system may further have a controller in communication with the force sensor and the speed sensor. The controller may be configured to modify a weight limit of the machine based on the measured force and the measured speed.

20 Claims, 3 Drawing Sheets

U.S. PATENT DOCUMENTS

| | | |
|---|---|---|
| 2005/0167164 A1 | 8/2005 | Takeda |
| 2006/0025895 A1 | 2/2006 | Jansson |
| 2007/0135137 A1 | 6/2007 | Olson |
| 2008/0042817 A1 | 2/2008 | Fogelstrom |
| 2008/0059411 A1 | 3/2008 | Greiner et al. |
| 2008/0082345 A1 | 4/2008 | Greiner et al. |
| 2008/0180523 A1 | 7/2008 | Stratton et al. |
| 2008/0314658 A1 | 12/2008 | Atarashi et al. |
| 2009/0248221 A1 | 10/2009 | O'Neal |

FOREIGN PATENT DOCUMENTS

| | | |
|---|---|---|
| EP | 1801551 A | 6/2007 |

OTHER PUBLICATIONS http://www.goodyear.com/media/pr/pr_2000/22169oh.html, Goodyear's New Temperature Prediction Model Improves On Current TKPH/TMPH Formula, Oct. 9, 2000, p. 1 of 1.

Preliminary New 724J-844J Tire Pressure Monitoring Option Bulletin, John Deere, Mar. 1, 2007, 2 pages.

Office Action from U.S. Appl. No. 12/057,895 mailed May 10, 2011 (14 pages).

* cited by examiner

PAYLOAD CONTROL SYSTEM BASED ON FORCE AND SPEED

TECHNICAL FIELD

The present disclosure relates generally to a payload control system and, more particularly, to a payload control system that modifies a weight limit of a machine based on a measured force and a measured speed.

BACKGROUND

A number of industries, such as the mining industry, rely on large mobile machines (e.g., off-road haul trucks and wheel loaders) to transport cargo loads. The loads can be very large, and the machines are often operated around the clock. As the mobile machine travels, tires of the mobile machine generate heat due to friction with the road surface.

One way to quantify the heat generation of a tire is by calculating the tire's ton-miles-per-hour (TMPH). A tire's TMPH (or ton-kilometers-per-hour, TKPH) may be proportional to the product of, for example, a payload of the mobile machine and a speed of the mobile machine. High TMPH values can indicate excessive amounts of heat generation, and excessive heat generation can lead to accelerated wear and failure of the mobile machine's tires. Due to the large cost of replacing tires, it is desirable to keep the tire's TMPH generally below a predetermined value.

One approach to limiting heat generation in mobile machine tires is disclosed in U.S. Pat. No. 6,842,680 (the '680 patent) issued to Doddek et al. on Jan. 11, 2005. The '680 patent discloses an apparatus for controlling the speed of a machine based on the ton-miles-per-hour of the machine. The apparatus includes a payload monitor adapted to generate a signal related to the weight of the machine and a speed monitor adapted to generate a signal related to the speed of the machine. Additionally the '680 patent discloses a vehicle information system having a processor and a database for transmitting and receiving a plurality of signals. The vehicle information system monitors the machine speed and compares an actual ton-miles-per-hour value to a percentage of a predetermined ton-miles-per-hour value (i.e., a ton-miles-per-hour limit). If the actual ton-miles-per-hour value exceeds the ton-miles-per-hour limit, the apparatus reduces the machine speed.

Although the apparatus of the '680 patent may use TMPH calculations to reduce machine speed and thus improve tire wear, it may still be improved. For example, in cases where the mobile machine is utilized in an operation involving multiple machines, limiting the speed of one machine can diminish the productivity of other machines by creating a bottleneck (e.g., when a second machine depends on the limiting machine, and a third machine depends on the second machine, etc.).

The disclosed machine system is directed to overcoming one or more of the problems set forth above.

SUMMARY

In one aspect, the present disclosure is directed to a payload control system for a machine having traction devices. The payload control system may include a force sensor configured to measure a force transmitted through the traction devices. The payload control system may also include a speed sensor configured to measure a speed of the machine. The payload control system may further include a controller in communication with the force sensor and the speed sensor. The controller may be configured to modify a weight limit of the machine based on the measured force and the measured speed.

In another aspect, the present disclosure is directed to a method of controlling a machine. The method may include measuring a speed of a machine during a first operation. The method may also include measuring a weight of the machine during a first operation. The method may further include adjusting a weight limit of the machine based on the measured speed and the measured weight of the machine during the first operation.

DETAILED DESCRIPTION

Figure 1:
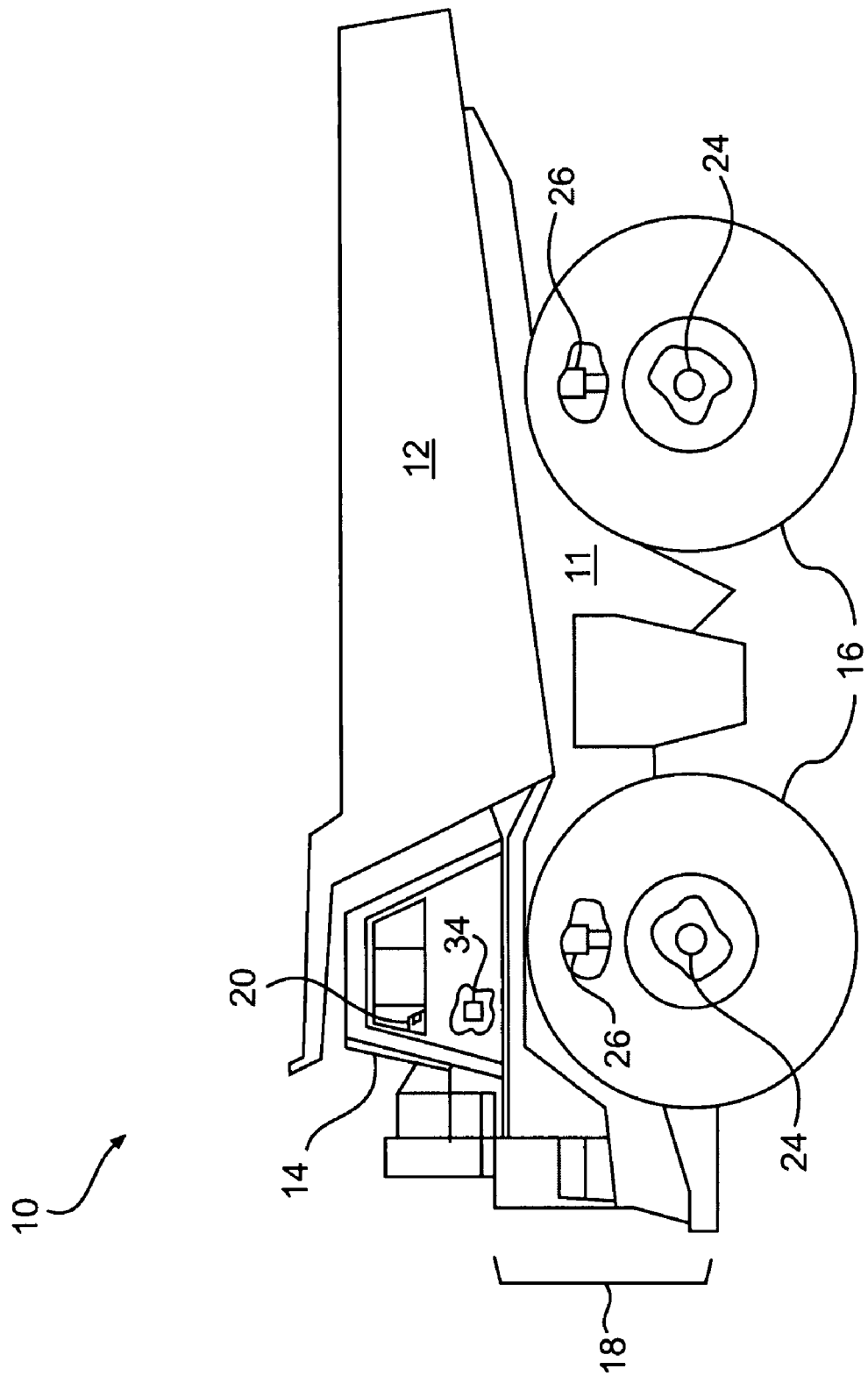
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine, such as an on- or off-road haul truck, a wheel loader, an excavator, a backhoe, or any other suitable earth moving machine known in the art. Machine 10 may include a frame 11, a haulage portion 12, an operator station 14, one or more traction devices 16, and a power source 18.

Frame 11 may be any appropriate structure that connects and/or couples haulage portion 12, operator station 14, traction devices 16, and power source 18. It is contemplated that other components may additionally be connected and/or coupled via frame 11.

Haulage portion 12 may be a structure configured to carry a payload, such as, for example, a dump bed, a bucket, or any other appropriate structure known in the art. Haulage portion may connect to frame 11 via one or more linkages, pivots, and/or actuators (not shown).

Operator station 14 may be a location from which an operator may control machine 10. Operator station 14 may include one or more operator input devices (not shown). Operator station 14 may also include an operator display 20 that provides information regarding the operation or performance of machine 10. It is contemplated that operator display 20 may include one or more audio and/or visual devices.

Traction devices 16 may embody one or more tires coupled to frame 11 and configured to allow translational motion of machine 10. For example, traction devices 16 may embody at least one front left tire, at least one front right tire, at least one left rear tire, and at least one right rear tire. Alternatively, traction devices 16 may embody tracks, belts, or other traction devices known in the art. Any of traction devices 16 may be driven and/or steerable.

Power source 18 may provide power for the operation of machine 10. Power source 18 may embody a combustion engine, such as a diesel engine, a gasoline engine, a gaseous fuel powered engine (e.g., a natural gas engine), or any other type of combustion engine known in the art. Power source 18 may alternatively embody a non-combustion source of power, such as a fuel cell or other power storage device coupled to a motor. Power source 18 may provide a rotational output to drive traction devices 16, thereby propelling machine 10.

Figure 2:
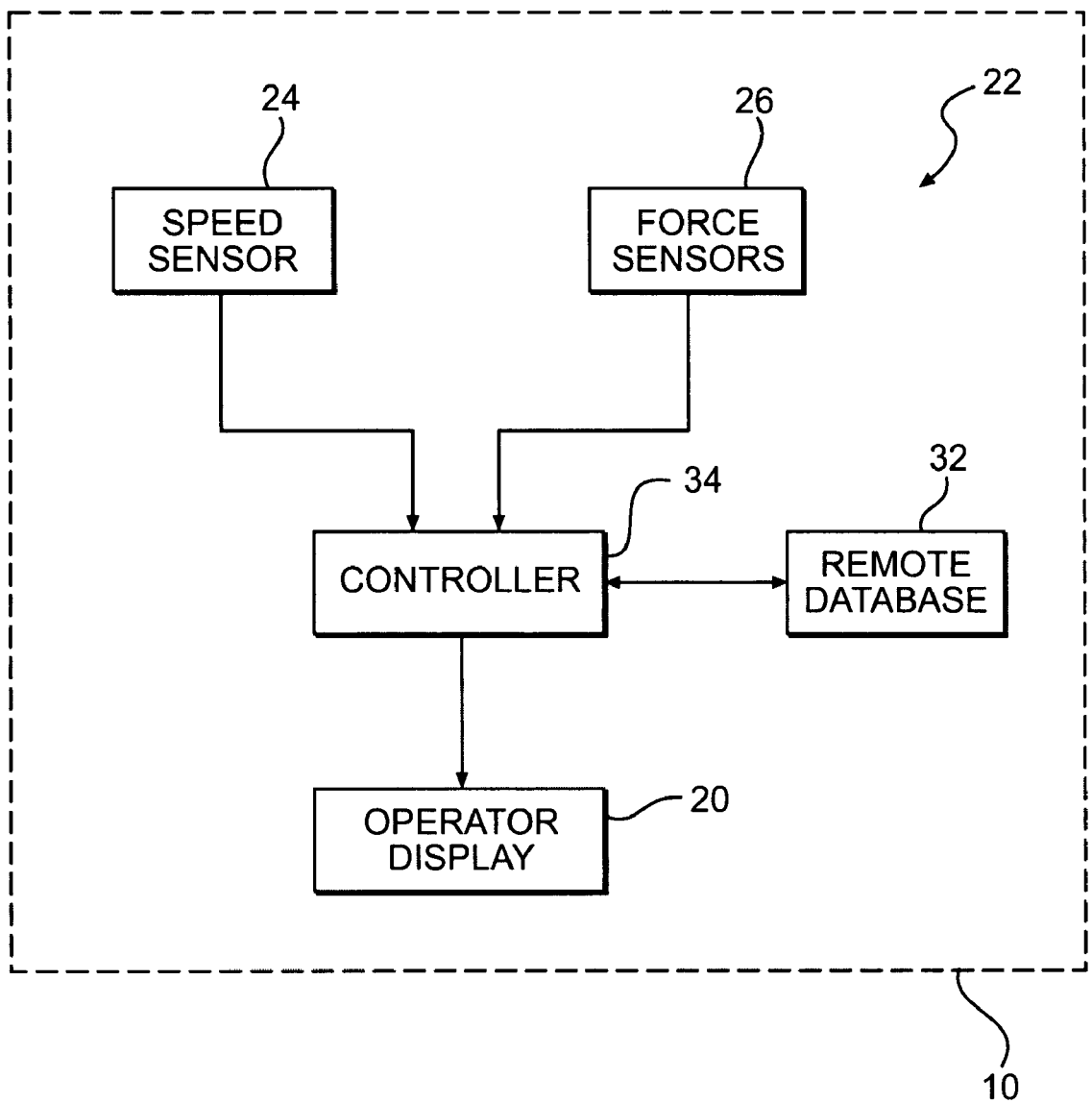
FIG. 2 is a schematic of an exemplary control system that may be used with the machine of FIG. 1.

As shown in FIG. 2, machine 10 may include a control system or payload control system 22. Control system 22 may include a speed sensor 24, one or more force sensors 26, a remote database 32, and a controller 34. Controller 34 may communicate with speed sensor 24, force sensors 26, operator display 20, and remote database 32 via one or more communication lines or via wireless devices (not shown). It is contemplated that controller 34 may also communicate with other components of machine 10.

Speed sensor 24 may be used to determine a travel speed of machine 10 or a rotational speed of a component of machine 10 that may be readily converted to a travel speed. Speed sensor 24 may sense the rotational speed of an axle (not shown), a transmission (not shown), one or more of traction devices 16, and/or any other suitable component of machine 10. Speed sensor 24 may embody, for example, a magnetic pick up sensor, a rotary encoder, a tachometer, or any other type of sensor configured to produce a signal corresponding to a machine travel speed. Speed sensor 24 may also sense the travel speed of machine 10 relative to external standards using, for example, a radar or a satellite based positioning device.

Force sensors 26 may be configured to measure a force acting on or transmitted through traction devices 16. Specifically, force sensors 26 may sense a pressure, a force, and/or a torque created by the weight of machine 10, an output of power source 18, and/or the weight of the payload in haulage portion 12. Force sensors 26 may embody, for example, piezoelectric transducers, strain gauges, capacitive sensors, and any other sensors known in the art. Force sensors 26 may be located at, for example, traction device struts (not shown), one or more haulage portion linkages or hydraulic cylinders (not shown), and/or any other proper location.

Remote database 32 may be a computing system that performs various functions. Remote database 32 may include a memory, a secondary storage device, a processor, and any other components for running an application. In one embodiment, remote database 32 may be configured to save data from or receive commands from a remote operator for controller 34.

Controller 34 may embody a single microprocessor or multiple microprocessors. Numerous commercially available microprocessors may be configured to perform the functions of controller 34, and it should be appreciated that controller 34 may readily embody a general machine microprocessor capable of monitoring and/or controlling numerous machine functions. Controller 34 may include a memory, a secondary storage device, a processor, and any other components for running an application. Various other circuits may be associated with controller 34, such as, for example, power supply circuitry, signal conditioning circuitry, data acquisition circuitry, signal output circuitry, signal amplification circuitry, and other types of circuitry known in the art. It is also considered that controller 34 may include one or more maps stored within an internal memory of controller 34. Each of these maps may include a collection of data in the form of tables, graphs, and/or equations.

Controller 34 may be configured to receive the force measurements from force sensors 26 and the travel speed measurements from speed sensor 24 and to calculate a quantity related to a traction device temperature, such as, for example, a TMPH value. The TMPH value may be proportional to the force F transmitted through traction devices 16 multiplied by the travel speed S as illustrated below:

$$TMPH \propto F \cdot S. \quad (1)$$

It is contemplated that F may be caused by the weight of machine 10, an output of power source 18, and/or the weight of the payload in haulage portion 12. Controller 34 may adjust the TMPH calculation to account for any load not sensed by force sensors 26 (e.g., forces created between the sensor and ground). It is further contemplated that the TMPH value may be averaged over an interval of time to determine an average TMPH. A single TMPH value may be calculated for a set of traction devices 16 or alternatively a TMPH value may be calculated for each of traction devices 16 independently (e.g., a TMPH may be calculated for each tire).

Controller 34 may also be programmed with a limit on the quantity related to the traction device temperature (e.g., a TMPH limit). The TMPH limit may be set by an operation supervisor or machine technician.

When the TMPH value satisfies one or more conditions (e.g., when machine 10 is traveling with a load and the TMPH is greater than the TMPH limit), controller 34 may take action to modify the TMPH value such that the condition is no longer satisfied. Controller 34 may take action by, for example, limiting the weight that machine 10 may carry via a controller imposed weight limit. It is contemplated that controller 34 may enforce the weight limit when machine 10 is being reloaded during a subsequent or future loading cycle, thus allowing machine 10 to travel at higher travel speeds during the subsequent or future loading cycle without exceeding the TMPH limit. The weight limit may be expressed in terms of the total weight of machine 10 plus the weight of the payload, the weight of the payload alone, or in any other appropriate manner.

INDUSTRIAL APPLICABILITY

The disclosed control system may be applicable to any machine where reduction of traction device wear is desired. The disclosed control system may reduce traction device wear while still allowing high machine travel speeds. The operation of control system 22 will now be described.

In an exemplary operation, a loading machine may place a load of material into haulage portion 12 of machine 10 while machine 10 is at a first location. Machine 10 may then transport the material (i.e., payload) along a route to a second location, unload the material at the second location, and then return to the first location to receive another load of material.

Figure 3:
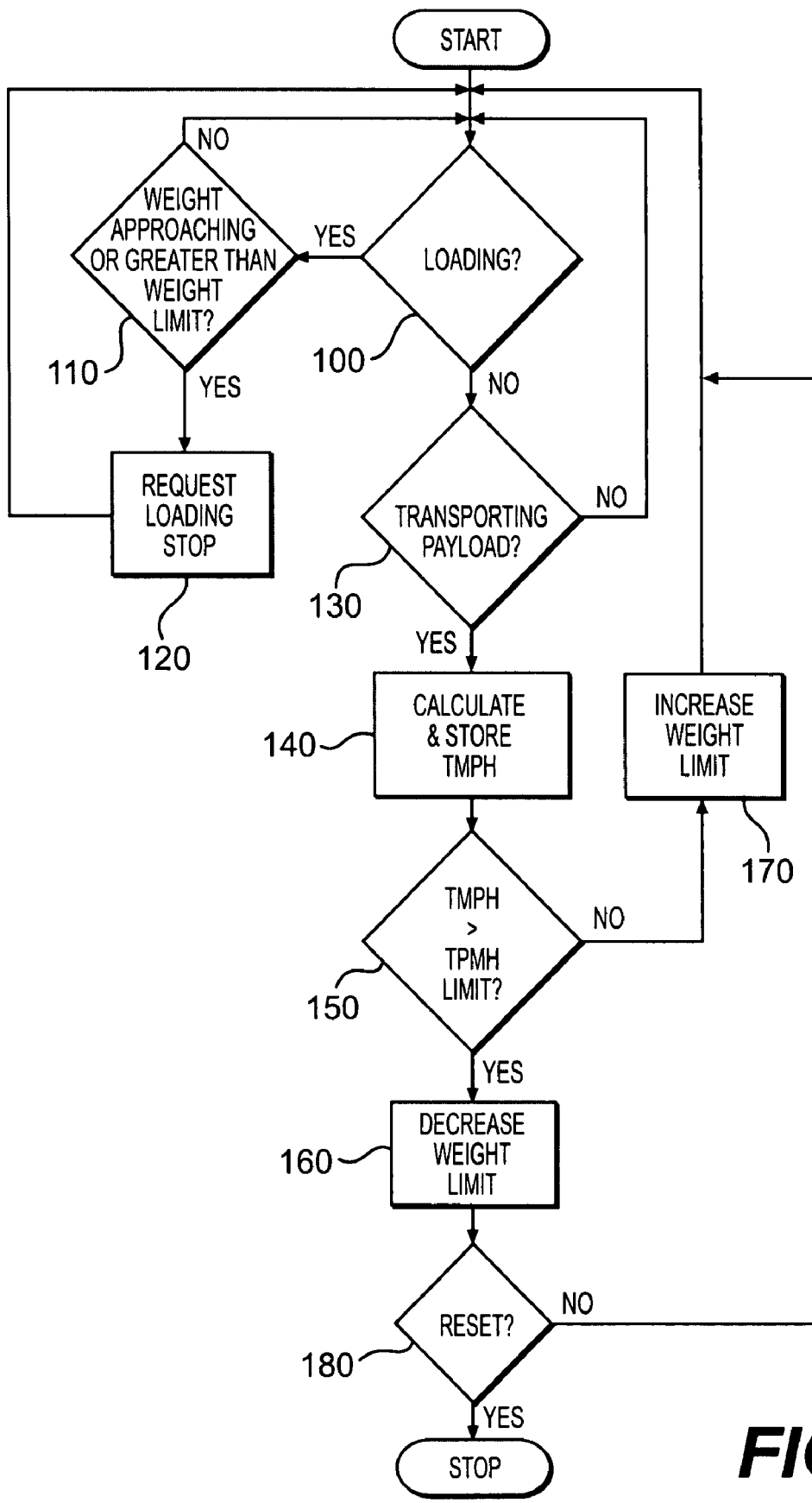
FIG. 3 is a flowchart depicting an exemplary operation of the control system illustrated in FIG. 2.

Referring to FIG. 3, controller 34 may begin by determining if machine 10 is being loaded with material (step 100). Controller 34 may determine that machine 10 is being loaded by communicating with the machine sensors (i.e., speed sensor 24 and force sensor 26) and determining if one or more loading conditions are satisfied. The loading conditions may include, for example, whether a weight of a payload in haulage portion 12 is increasing (determined via force sensors 26), whether machine 10 is stopped (determined via speed sensor 24), whether an operator has indicated loading (determined via a signal from the an operator input device or remote database 32), and/or whether any other appropriate condition is satisfied.

It is contemplated that an original weight limit may be set for machine 10 in controller 34. The original weight limit may be set prior to step 100 and may be determined via, for example, traction device manufacturer information and/or a TMPH study. While machine 10 is loading (i.e., being loaded), controller 34 may communicate with force sensors 26 to determine if a current weight is approaching (e.g., within a certain percentage of) or has exceeded the weight limit imposed by controller 34 (step 110). The current weight may include the weight of machine 10 and/or the weight of the payload. If the current weight is not approaching or has not exceeded the weight limit, controller 34 may return to step 100. If the current weight is approaching or has exceeded the weight limit, controller 34 may request a loading stop (step 120). To command a stop to the loading process, controller 34 may communicate with the loading machine (in cases where a loading machine is used), an operator of the loading machine, and/or an operator of machine 10. Controller 34 may command a stop to the loading process by sending a warning message (i.e., notification) via operator display 20 (or another appropriate device) indicating that the current weight is approaching or has exceeded the weight limit and loading should be discontinued. Operator display 20 may use both visual and auditory means to convey the warning message.

When controller 34 determines that loading has stopped (e.g., the one or more loading conditions is no longer satisfied), controller may determine if machine 10 is traveling or transporting the payload (step 130) by communicating with the machine sensors and determining if one or more traveling conditions is satisfied. The traveling conditions may include, for example, whether machine 10 is experiencing vibratory forces (determined via force sensors 26), whether machine 10 is moving (determined via speed sensor 24), and/or whether an operator has indicated traveling (determined via signal from the operator input device or remote database 32). It is contemplated that controller 34 may alternatively or additionally use other appropriate conditions to determine if machine 10 is traveling or loading, such as, for example, transmission gear ratio, power source rpm, and cycle time.

If controller 34 determines that machine 10 is not traveling, controller 34 may return to step 100. If controller 34 determines that machine 10 is traveling, controller 34 may then determine the TMPH value related to traction devices 16 (step 140). To calculate TMPH, controller 34 may use data received from force sensors 26 and speed sensor 24 to determine F and S. Controller may then multiply F and S to determine a TMPH value (see Equation (1)). It is contemplated that the TMPH value may be calculated using force and speed sensor data received over a selectable period of time (e.g., 2, 4, or 8 hours). After calculation, the TMPH value may be stored in the memory of controller 34 and/or remote database 32.

Controller 34 may determine if the TMPH value is greater than a TMPH limit (step 150). If the TMPH value is greater than the TMPH limit, controller 34 may decrease the weight limit (step 160). Controller 34 may decrease the weight limit proportional to the degree that the TMPH value exceeds the TMPH limit. For example, if the TMPH value exceeds the TMPH limit by 30%, the weight limit may be decreased by 30%. It is contemplated that the operation supervisor or machine technician may set the TMPH limit based on traction device manufacturer information and/or information from a TMPH study. It is further contemplated that controller 34 may send a warning message via operator display 20 when the TMPH value exceeds the TMPH limit.

For example, machine 10 may travel along a straightaway or downgrade that causes machine 10 to increase its travel speed. This increase in travel speed may cause the TMPH value (which may be averaged over a period of several hours) to exceed the TMPH limit. To prevent decreases in productivity, the operator may choose to continue to exceed the TMPH limit rather than decrease the machine travel speed. Controller 34 may react by decreasing the weight limit sufficiently such that the TMPH value is unlikely to exceed the TMPH limit if machine 10 experiences similar conditions during a subsequent cycle (e.g., the operator continues to exceed the TMPH limit during the next cycle to improve productivity).

Alternatively, if the TMPH value is less than the TMPH limit, controller 34 may increase the weight limit (step 170). Controller 34 may increase the weight limit proportional to the degree that the TMPH value is below the TMPH limit. It is contemplated that controller 34 may increase the weight limit up to but not above the original weight limit set in controller 34.

Controller 34 may also reset or stop (step 180). Controller 34 may reset upon, for example, operation supervisor or machine technician request. Alternatively, controller 34 may return to step 100.

Several advantages of the disclosed control system may be realized. In particular, the disclosed control system may reduce traction device wear while still allowing high machine travel speeds. Allowing high travel speeds may prevent bottlenecks in operations where multiple machines operate in a series-type operation (i.e., where the operation speed of one machine is dependent on the operation speed of another machine).

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope being indicated by the following claims.

What is claimed is:

1. A payload control system for a machine having traction devices, comprising:
a force sensor configured to measure a force transmitted through the traction devices;
a speed sensor configured to measure a speed of the machine; and
a controller in communication with the force sensor and the speed sensor, the controller being configured to modify a weight limit of the machine based on the measured force and the measured speed.

2. The payload control system of claim 1, wherein the controller is configured to use the measured force and the measured speed to calculate a quantity related to a traction device temperature, and the controller is configured to decrease the weight limit if the quantity is above a quantity limit.

3. The payload control system of claim 2, wherein the controller is configured to send a notification via an operator display when the quantity has exceeded the quantity limit.

4. The payload control system of claim 2, wherein the controller is configured to increase the weight limit if the quantity is below the quantity limit.

5. The payload control system of claim 4, wherein the controller is configured to modify the weight limit proportional to a degree that the quantity deviates from the quantity limit.

6. The payload control system of claim 4, wherein the controller is configured to use information from the force sensor and the speed sensor to determine when the machine is traveling, and the controller is configured to modify the weight limit only when the machine is traveling.

7. The payload control system of claim 2, wherein the controller is configured to send a notification via an operator display when a current weight is approaching the weight limit.

8. The payload control system of claim 7, wherein the controller is configured to use information from the force sensor and the speed sensor to determine when the machine is being loaded, and the controller is configured to send the notification only when the machine is being loaded.

9. The payload control system of claim 2, wherein the quantity is a TMPH value.

10. A method of controlling a machine having traction devices, comprising:
   measuring a speed of the machine with a speed sensor during a first operation;
   measuring a weight of the machine during the first operation;
   adjusting a weight limit of the machine with a controller based on the measured speed and the measured weight of the machine during the first operation; and
   notifying an operator when a current weight has exceeded the weight limit.

11. The method of claim 10, further including calculating a quantity related to a traction device temperature using the measured speed and the measured weight.

12. The method of claim 11, wherein calculating includes averaging the quantity over an interval of time.

13. The method of claim 12, wherein adjusting includes decreasing the weight limit proportional to a degree that the quantity deviates from a quantity limit.

14. The method of claim 10, wherein adjusting occurs when at least one of the measured speed or the measured weight indicates that the machine is traveling.

15. The method of claim 10, wherein notifying occurs when at least one of the measured speed or the measured weight indicates that the machine is being loaded.

16. The method of claim 15, wherein the adjusted weight limit is applied to the machine when the machine is being loaded during a second operation.

17. The method of claim 11, wherein the quantity is a TMPH value.

18. A machine, comprising:
   a haulage portion configured to carry a load;
   a frame connected to the haulage portion;
   at least one traction device connected to the frame; and
   a controller configured to calculate a quantity related to a temperature of the at least one traction device and to modify a weight limit of the machine based on the quantity.

19. The machine of claim 18, wherein the controller is configured to modify the weight limit proportional to a degree that the quantity deviates from a quantity limit and send a notification via an operator display when a current weight is approaching the weight limit.

20. The method of claim 10, wherein measuring a weight of the machine includes measuring a force transmitted through the traction devices with a force sensor.

\* \* \* \* \*